United States Patent
Kato et al.

[11] Patent Number: 5,431,505
[45] Date of Patent: Jul. 11, 1995

[54] OPERATING ENVIRONMENT SETTING SYSTEM AND METHOD FOR PRINTER

[75] Inventors: Takashi Kato; Katsuhiko Nishikzawa, both of Nagano, Japan

[73] Assignee: Seiko Epson Corporation, Tokyo, Japan

[21] Appl. No.: 55,369

[22] Filed: May 3, 1993

[30] Foreign Application Priority Data

May 14, 1992 [JP] Japan .................. 4-148248

[51] Int. Cl.⁶ .............................. B41J 3/46
[52] U.S. Cl. ..................... 400/703; 400/83
[58] Field of Search ...... 400/61, 76, 703, 83

[56] References Cited

U.S. PATENT DOCUMENTS

| | | | |
|---|---|---|---|
| 4,836,699 | 6/1989 | Babsch et al. | 400/76 |
| 4,990,005 | 2/1991 | Karakawa | 400/76 |
| 5,024,544 | 6/1991 | Taketani | 400/692 |

FOREIGN PATENT DOCUMENTS

| | | | |
|---|---|---|---|
| 0076328 | 4/1983 | European Pat. Off. | 400/76 |
| 2155674 | 9/1985 | European Pat. Off. | 400/76 |
| 2227112 | 7/1990 | European Pat. Off. | 400/76 |
| 4122421 | 6/1992 | Germany | 400/703 |
| 61-143171 | 6/1986 | Japan | 400/703 |
| 62-253472 | 5/1987 | Japan | 400/703 |
| 3247478 | 5/1991 | Japan | 400/703 |
| 2211970 | 7/1989 | United Kingdom | 400/703 |

OTHER PUBLICATIONS

*Patent Abstracts of Japan*, vol. 12, No. 131 (M-688) 22 Apr. 1988 (JP-A-62 253 473, Nov. 1987).
*Patent Abstracts of Japan*, vol. 13, No. 555 (M904) 11 Dec. 1989 (JP-A-01 228 878, Sep. 1989).

*Primary Examiner*—David A. Wiecking
*Assistant Examiner*—Steven S. Kelley
*Attorney, Agent, or Firm*—Sughrue, Mion, Zinn, Macpeak & Seas

[57] ABSTRACT

An operating environment setting system for a printer which includes a plurality of switches for selecting basic functions of the printer, environment data storage means for storing a setting of a printer operating environment, menu storage means for storing a menu in which the environment setting items are correlated with display conditions of display means, selecting means for selecting an environment item by pressing the switches, and the display means for displaying a judgment result of the selecting means in the form of a display condition of the display means. The invention also encompasses an accompanying method for setting the operating environment of the printer.

8 Claims, 6 Drawing Sheets

| DISPLAY 1 | DISPLAY 2 | READY DISPLAY | SELECTABLE ITEM | SELECTABLE DETAILS |
|---|---|---|---|---|
| OFF | ON | OFF | Emulation | ESC/P |
| | | ON | | IBM Proprinter |
| OFF | BLINK | OFF | Character pitch | Pica |
| | | ON | | Elite |
| ON | OFF | OFF | Page length group | (A) 11inch, 12inch |
| | | ON | | (B) 8.5inch, 70/6inch |
| ON | ON | OFF | Page length | (A) 11inch |
| | | ON | | (A) 12inch |
| | | OFF | | (B) 8.5inch |
| | | ON | | (B) 70/6inch [A4] |
| ON | BLINK | OFF | Skip perforation | No skip |
| | | ON | | Skip 1 inch |
| BLINK | OFF | OFF | Zero face | 0 |
| | | ON | | 0 with slash |
| BLINK | ON | OFF | Automatic tear-off | Valid |
| | | ON | | Invalid |
| BLINK | BLINK | OFF | Automatic LF by CR | Depend on I/F |
| | | ON | | Valid |

FIG. 3

| DISPLAY 1 | DISPLAY 2 | READY DISPLAY | SELECTABLE ITEM | SELECTABLE DETAILS |
|---|---|---|---|---|
| OFF | ON | OFF | Emulation | ESC/P |
| | | ON | | IBM Proprinter |
| OFF | BLINK | OFF | Character pitch | Pica |
| | | ON | | Elite |
| ON | OFF | OFF | Page length group | ⟨A⟩ 11inch, 12inch |
| | | ON | | ⟨B⟩ 8.5inch, 70/6inch |
| ON | ON | OFF | Page length | ⟨A⟩ 11inch |
| | | ON | | ⟨A⟩ 12inch |
| | | OFF | | ⟨B⟩ 8.5inch |
| | | ON | | ⟨B⟩ 70/6inch [A4] |
| ON | BLINK | OFF | Skip perforation | No skip |
| | | ON | | Skip 1 inch |
| BLINK | OFF | OFF | Zero face | 0 |
| | | ON | | 0 with slash |
| BLINK | ON | OFF | Automatic tear-off | Valid |
| | | ON | | Invalid |
| BLINK | BLINK | OFF | Automatic LF by CR | Depend on I/F |
| | | ON | | Valid |

FIG. 4

| DISPLAY 1 | DISPLAY 2 | READY DISPLAY | CHARACTER TABLE |
|---|---|---|---|
| OFF | OFF | ON | Italic-U.S.A. |
| OFF | OFF | BLINK | Italic-France |
| OFF | ON | OFF | Italic-Germany |
| OFF | ON | ON | Italic-U.K. |
| OFF | ON | BLINK | Italic-Denmark 1 |
| OFF | BLINK | OFF | Italic-Sweden |
| OFF | BLINK | ON | Italic-Italy |
| OFF | BLINK | BLINK | Italic-Spain 1 |
| ON | OFF | OFF | PC 437 |
| ON | OFF | ON | PC 850 |
| ON | OFF | BLINK | PC 860 |
| ON | ON | OFF | PC 863 |
| ON | ON | ON | PC 865 |

FIG. 5

| DISPLAY 1 | DISPLAY 2 | READY DISPLAY | UPPER MARGIN |
|---|---|---|---|
| OFF | OFF | ON | -3 |
| OFF | OFF | BLINK | -2 |
| OFF | ON | OFF | -1 |
| OFF | ON | ON | ±0 |
| OFF | ON | BLINK | +1 |
| OFF | BLINK | OFF | +2 |
| OFF | BLINK | ON | +3 |

FIG. 7

```
--- CURRENT SETTING ---
Emulation           ESC/P
Character Pitch     Pica
Page length         11 inch
Skip perforation    No skip
Zero face           0
Automatic tear-off  Valid
Automatic LF by CR  Depend on I/F
----------------------------------------
                    Turn on again to change setting above
                    while [FONT] key depressed.

CG TABLE            U.S.A.
----------------------------------------
                    Turn on again to change setting above
                    while [LF/FF] key depressed.

TEAR PAPER OFF POSITION         0
----------------------------------------
                    Turn on again to change setting above
                    while both [FONT] and [LF/FF] key depressed.

!"#$%&'()*+-./0123456789:;<=>?@ABCDEFGHIJKLMNOPQRSTUVWXYZ[\]^_`abcdef
!"#$%&'()*+-./0123456789:;<=>?@ABCDEFGHIJKLMNOPQRSTUVWXYZ[\]^_`abcdefg
"#$%&'()*+-./0123456789:;<=>?@ABCDEFGHIJKLMNOPQRSTUVWXYZ[\]^_`abcdefgh
```

OPERATING ENVIRONMENT SETTING SYSTEM AND METHOD FOR PRINTER

BACKGROUND OF THE INVENTION

The invention relates to an environment setting system and method for a recording apparatus, particularly, a printer, which is used to set functions so that the recording apparatus can be interfaced with different types of computers or other equipment.

It is desirable that a printer be designed to be flexible so that a variety of types of data output units can be interfaced therewith. That is, the printer should be capable of operating with a plurality of different types or sets of print format-related data such as the page length of the recording paper, etc., as well as different serial interface protocols, printer control codes, and characters codes. Switches and jumpers are also provided so that the user can select desired functions.

However, during manufacture of the printer, a number of steps are required in wiring these switches and mounting the switch parts, thereby increasing costs and reducing reliability.

To overcome these problems, a printer control system has been proposed which involves a software switch implemented utilizing, for example, the printer's sheet forwarding switch and paper discharge switch, which are otherwise necessarily provided to control the printer's operations. (See Japanese Patent Examined Publication. No. 10974/1990.)

This system allows a display or a default setting switch to be dispensed with, thus reducing costs and improving reliability. On the other hand, the system disadvantageously requires a printing operation to be carried out each time an item is set or changed, thereby impairing the operability of the printer.

SUMMARY OF THE INVENTION

The invention has been made in view of the above circumstances. Accordingly, an object of the invention is to provide an operating environment setting system for a printer with the smallest and simplest possible display device, yet which is excellent in operability and which dispenses with the printing operation during setting procedures.

To achieve the above and other objects, the invention provides an operating environment setting system for a printer, which includes a plurality of switches for selecting basic functions of the printer, environment data storage means for storing an operating environment of the printer, menu storage means for storing a menu in which environment setting items and display conditions of display means are interrelated, selecting means for selecting an environment item by pressing the switches, and display means for displaying a judgment result of the selecting means in the form of a display condition of the display means.

Prior to the setting of an environment item, the relation between the display conditions of the display means and a setting item is printed on a recording sheet as a menu. Since this menu includes the description of the relation between display conditions of the display means and setting items, a desired environment item can be selected by changing the display condition of the display means so as to match the setting item using the switches.

BRIEF DESCRIPTION OF THE DRAWINGS

FIG. 3 is a diagram showing an exemplary hard copy of data stored as a guide;

FIG. 4 is another exemplary hard copy of data stored as a guide;

FIG. 5 is still another exemplary hard copy of data stored as a guide;

FIG. 7 is a diagram showing exemplary data to be printed at the time of setting defaults.

DESCRIPTION OF THE PREFERRED EMBODIMENTS

Preferred embodiments of the invention will now be described in detail with reference to the drawings.

Figure 2:
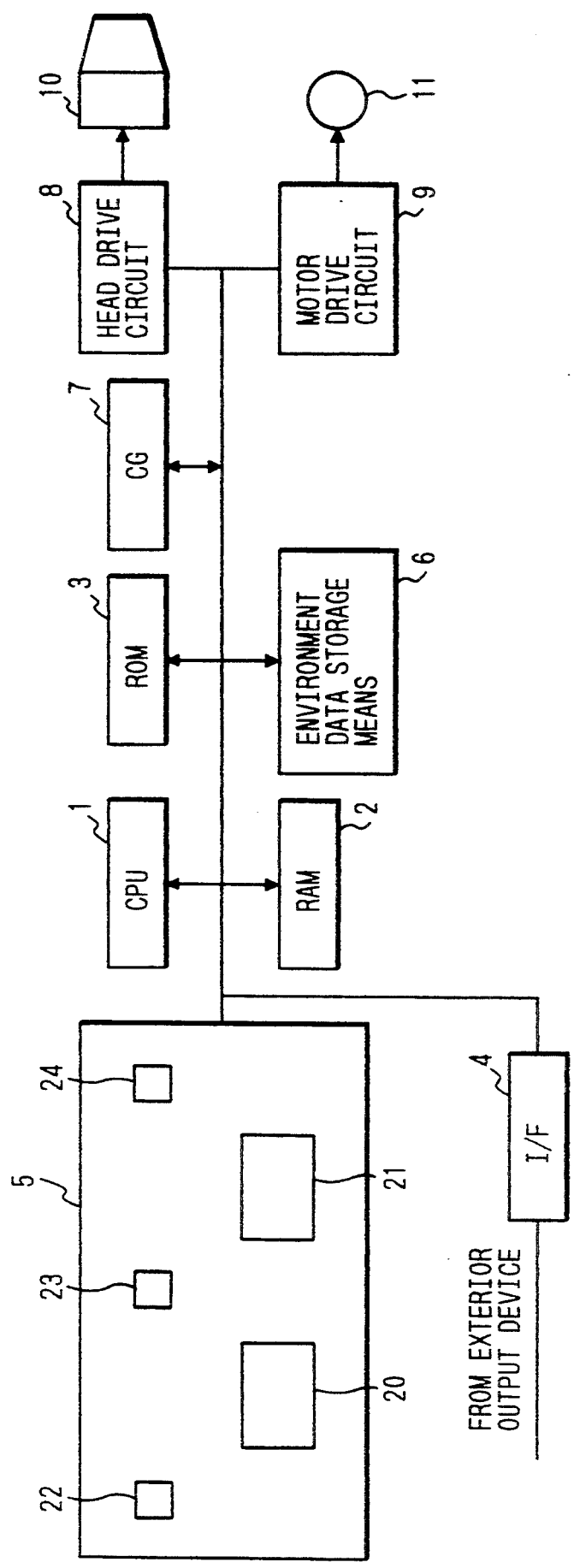
FIG. 2 is a block diagram showing an exemplary printer to which the operating environment setting system of the invention is applied.

FIG. 2 is a diagram showing the overall configuration of an operating environment setting system constructed in accordance with a preferred embodiment of the invention. In FIG. 2, reference numeral 1 designates a CPU which functions as a controller and constitutes a microcomputer together with a RAM 2 for providing a work area and the like, and a ROM 3 for storing control programs. An external data output unit and switches for selecting the basic functions of a printer, such as a font selecting switch 20, a sheet forwarding switch 21, and a plurality of displays 22, 23 and 24 implemented with light-emitting diodes or the like are connected to the CPU 1 through an interface 4. The switches and the displays constitute a control panel 5.

Reference numeral 6 designates environment data storage means, which is constituted by an electrically erasable semiconductor memory. The environment data storage means erasably stores data specifying the basic functions of the printer, such as emulation data for decoding control codes of the external data output unit, types of character patterns used at the time of printing, sizes of recording paper, and margins.

Reference numeral 7 designates a character generator for converting data inputted through the interface 4 into dot matrix data. The character generator 7 is formed by storing a plurality of character fonts as necessary.

Reference numerals 8 and 9 designate a head drive circuit and a motor drive circuit, respectively. These circuits are respectively employed to drive a recording head 10 and a motor 11 of a recording paper handling mechanism, such as a sheet forwarding mechanism, based on the data from the microcomputer.

Figure 1:
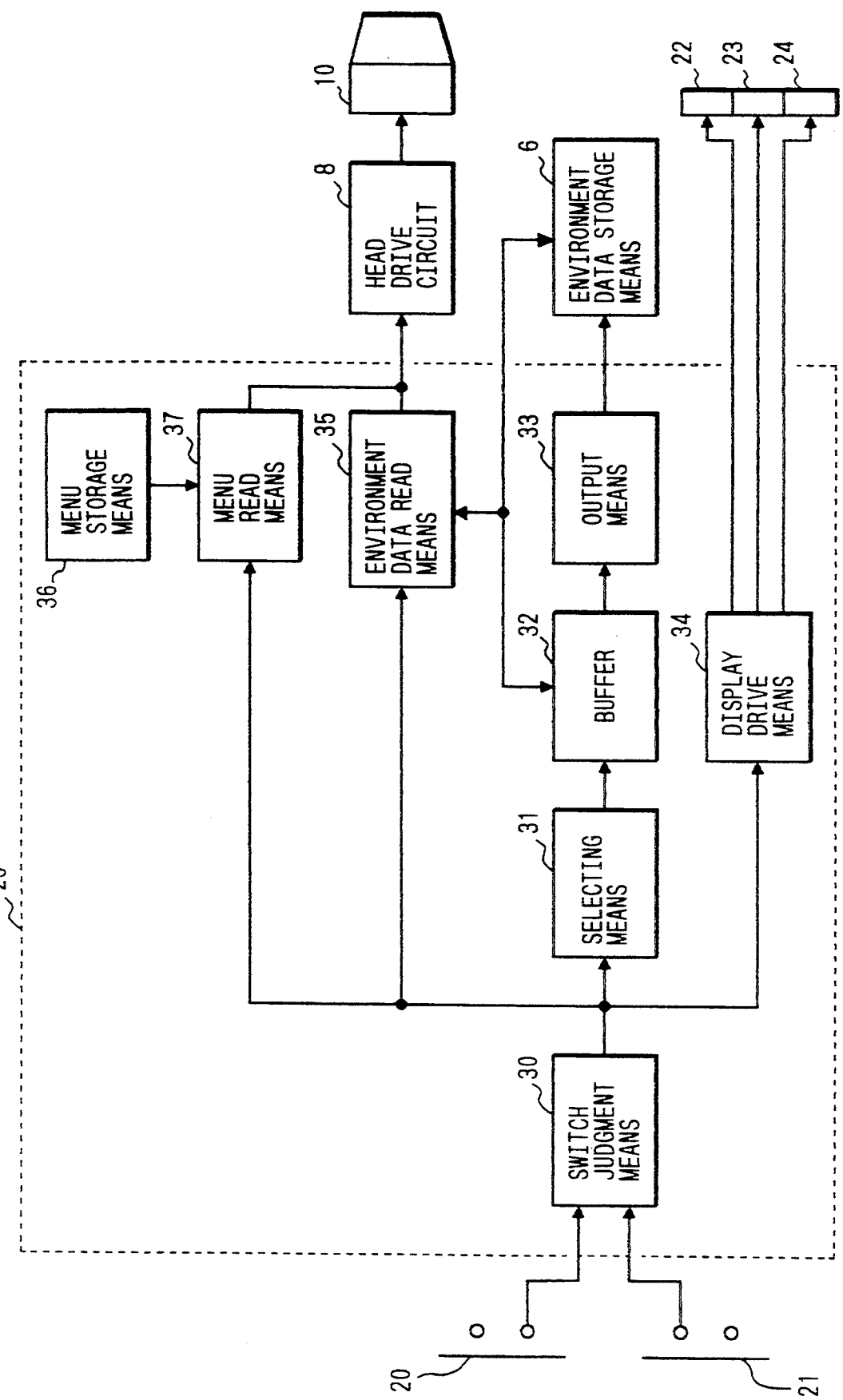
FIG. 1 is a block diagram showing an operating environment setting system for a printer, which is constructed in accordance with a preferred embodiment of the invention.

FIG. 1 is a block diagram showing the functions performed by the microcomputer. The microcomputer is programmed so as to implement switch judgment means 30 for judging the state of the switches 20 and 21 in the default set mode at the time the power is turned on, selecting means 31 for selecting an environment to be set by a signal sent from the switch judgment means 30, a buffer 32 for storing set data temporarily, output means 33 for causing the environment data storge means 6 to store the data in the buffer 32 at the time the environment data is set, display drive means 34 for driving the displays 22, 23 and 24 so as to correspond to the pressing conditions of the switches 20 and 21, environment data reading means 35 for reading the data stored in the environment data storge means 6 at the time the environment is set, and menu reading means 37 for reading data from menu storage means 36 (described later) at the time the environment is set.

The data stored in the menu storage means 36 will be described next.

FIGS. 3, 4 and 5 show the data stored in the menu storage means 36. FIG. 3 shows basic operation items, i.e., selection of control codes of the printer, character pitch, page length, sheet forward mode at the time of printing on successive paper, typeface of the zero character "0" and the relation between the sheet forwarding code signals and the displays 22, 23 and 24. FIG. 4 shows the relation among the displays 22, 23 and 24 that select font data if the character generator 7 has a plurality of kinds of font data. FIG. 5 shows data defining the relation between the upper margin and the displays 22, 23 and 24.

Figure 6:
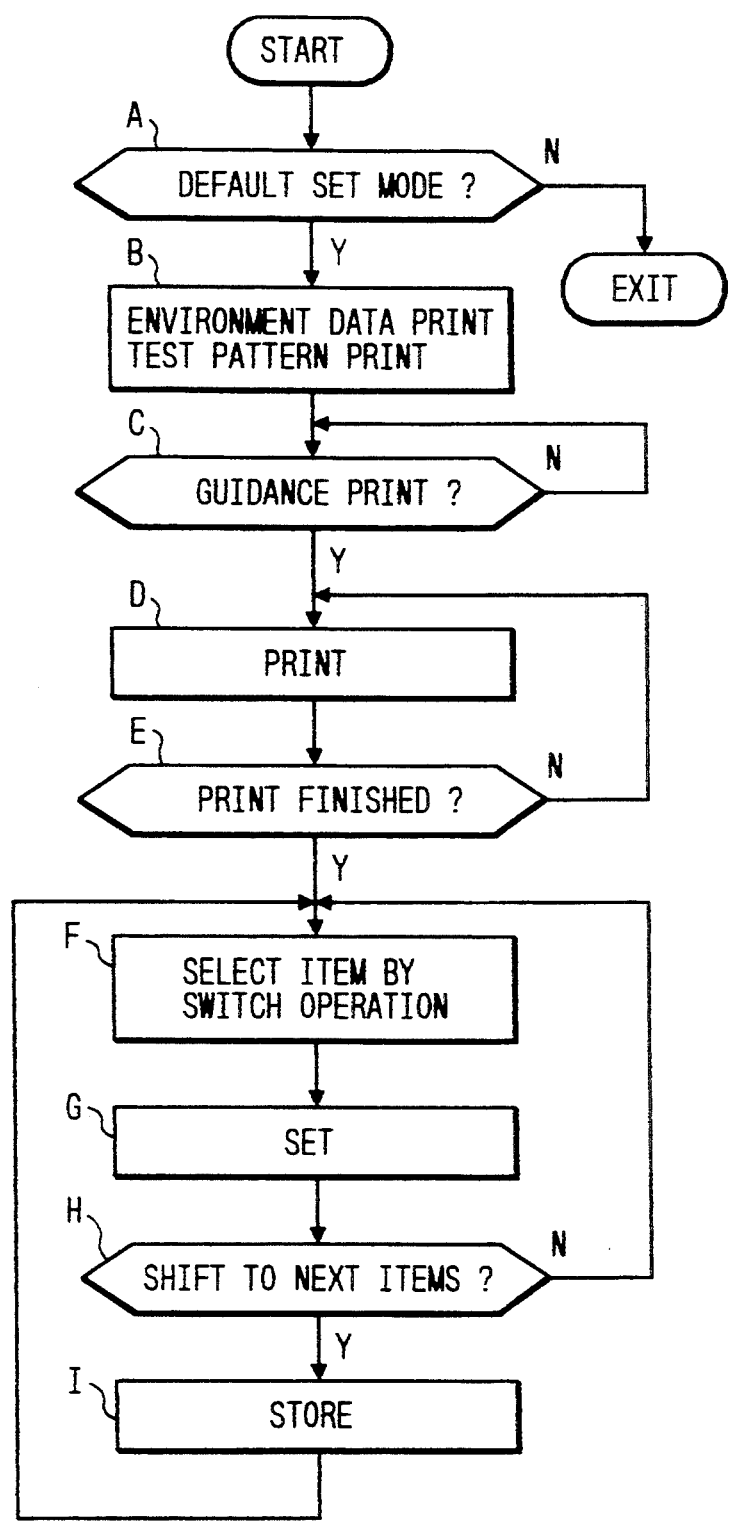
FIG. 6 is a flowchart showing an operation of the operating environment setting system shown in FIG. 1.

The operation of the thus-configured system will be described with reference to the flowchart shown in FIG. 6.

When a power switch (not shown) of the main body of the printer has been turned on while a function switch, e.g., the font selecting switch 20, is pressed, the switch judgment means 30 judges that the function switch is set to the default set mode (Step A), whereupon a sheet of recording paper is loaded to a recording paper handling mechanism. When the function switch is not set to the default set mode, the data stored in the environment data storage means 6 is read as an initial value to operate a printer. Upon completion of the preparatory work for printing, the environment data stored in the environment data storage means 6 is read, and the read data is stored in the buffer 32 and outputted to the recording head. Then, a test chart suitable for checking tile print quality is printed (Step B).

By the above operation, a recording paper on which the current environment data followed by a test pattern for checking the character and print quality are printed as shown in FIG. 7 is printed and provided to the operator.

To change the CURRENT SETTING under this condition, the font selecting switch 20 is pressed (Step C). Then, the switch judgment means 30 reads the menu data related to the CURRENT SETTING stored in the menu storage means 36. This data is printed on the recording paper by the recording head 10 as a guide so that the setting items can be selected in combination of display conditions of the displays 22, 23 and 24, i.e., a combination of "ON", "OFF", and "BLINK" as shown in FIG. 3 (Step D). After the menu, has been printed (Step E), the display conditions of the displays 22, 23 and 24 corresponding to the desired item to be set are searched while referring to the printed menu, and the switches 20 and 21 are operated to obtain the desired display conditions (Step F).

Specifically, the display conditions of the displays 22 and 23 can be changed every time the font selecting switch 20 is pressed, and the display condition of the display 24 can be changed every time the sheet forwarding switch 21 is pressed.

For example, to change the character set from "Pica", which is the current setting, to "Elite", the font selecting switch 20 is continuously pressed until the display 22 is held "OFF" and the display 23 is set to "BLINK". At this point, the display 22 is held "OFF" and the display 23 is set in the "BLINK" state, but the display 24 is held "OFF" since "Pica" is set as the current setting. Then, the sheet forwarding switch 21 is pressed to change the display 24 to "ON", so that the character pitch item in the buffer 32 is set to "Elite" (Step G).

When the desired item has been set in this way and the font selecting switch 20 has been pressed to shift the display conditions of the displays 22, 23 and 24 to the next items (Step H), the last data is stored in the environment data storge means 6 from the buffer 32 (Step I).

Upon the completion of performing the CURRENT SETTING operation, the power switch of the printer is turned on again to reset the printer. As a result, the printer performs its operations with the new data stored in the environment data setting storage means 6 as a default.

If the sheet forwarding switch 21 is pressed in Step C, the printer outputs a guide related to the CG TABLE shown in FIG. 4, whereas if the font selecting switch 20 and the sheet forward switch 21 are pressed at the same time, the printer outputs a guide related to "Tear Paper Off Position" to permit a setting change by a similar operation of the font selecting switch 20 and the sheet forwarding switch 21.

While the font selecting switch 20 and the sheet forwarding selecting switch 21 and the three displays 22, 23 and 24 are used in this embodiment, other switches and displays provided on the printer may be used to increase not only the number of switches but also the number of displays involved in setting the defaults. In addition, the same advantages can be obtained by using a display device having a plurality of display areas provided on a single display surface, such as a liquid crystal display panel.

As described above, the invention is characterized as including a plurality of switches for selecting basic functions of the printer, environment data storage means for storing the setting of the printer operating environment, menu storage means for storing a menu in which environment setting items and display conditions of display means are correlated, selecting means for selecting environment items by pressing the switches, and display means for displaying the judgment result of the selecting means in the form of display conditions, so that not only can the various setting items be outputted as a hard copy, but also the selection of setting items is specified by the display means provided on a panel. As a result, the switching operation can be performed by referring to the menu prepared in advance, and the environment setting can be effected easily with the provision of minimal display means. Further, in contrast to the conventional technique involving an interactive operation of setting items, only selected items can be changed, thus allowing not only the setting time to be reduced, but also the setting contents to be simplified.

What is claimed is:

1. An operating environment setting system for a printer comprising:
a plurality of switches for selecting basic functions of the printer;
environment data storage means for storing a plurality of printer operating environment items;
display means having a plurality of display conditions associated with said plurality of items, respectively;
menu storage means for storing a menu, said menu including said plurality of items and said associated plurality of display conditions so as to enable an operator to identify one of said display conditions associated with a desired one of said items;

printing means for printing said menu; and selecting means for selecting and storing said desired one of said items in said environment data storage means in response to an operation of selected ones of said plurality of switches, said display means displaying a judgment result of said selecting means in the form of display conditions of said display means wherein at least one of said plurality of switches is operated so that said display condition of said display means is the selected one of said display conditions of the desired one of said items found in said menu printed by said printing means.

2. The operating environment setting system for a printer of claim 1, wherein said switches comprise a font selecting switch and a sheet forwarding switch.

3. The operating environment setting system for a printer of claim 1, wherein said display means comprises a plurality of LEDs.

4. The operating environment setting system for a printer of claim 1, wherein said display conditions are "ON", "OFF" and "BLINK".

5. A method for setting an operating environment for a printer, comprising the steps of:

storing in said printer a plurality of printer operating environment setting items for establishing a printer operating environment of said printer;

storing in said printer a menu containing states of said printer operating environment setting items correlated with display conditions of a display means of said printer;

placing said printer in a printer operating environment setting state;

printing said menu with said printer;

operating at least one of a plurality of switches for selecting basic functions of said printer to select one of said printer operating environment setting items to be changed;

displaying with said display means display conditions indicative of a state of the selected one of said printer operating environment setting items;

operating said switches to change said selected one of said printer operating environment setting items to a desired state by comparing said display conditions of said display means with the display conditions on the printed menu; and storing the changed selected one of said printer operating environment setting items.

6. The method of claim 5, wherein said switches comprise a font selecting switch and a sheet forwarding switch.

7. The method of claim 5, wherein said display means comprises a plurality of LEDs.

8. The method of claim 6, wherein said display conditions are "ON" "OFF" and "BLINK".

* * * * *